United States Patent [19] [11] 4,156,656
Dannenberg et al. [45] May 29, 1979

[54] PREPARATION OF HYDROSULFIDES

[75] Inventors: Raymond O. Dannenberg; Henry Dolezal, both of Salt Lake City, Utah

[73] Assignee: The United States of America as represented by the Secretary of the Interior, Washington, D.C.

[21] Appl. No.: 915,104

[22] Filed: Jun. 13, 1978

[51] Int. Cl.² ............... C01B 17/32; C01B 17/42
[52] U.S. Cl. ........................... 252/175; 210/42 R; 423/514; 423/560; 423/562; 423/565
[58] Field of Search ............ 423/560, 514, 562, 565; 252/175; 210/42 R

[56] References Cited

U.S. PATENT DOCUMENTS

Re. 18,902  7/1933  Lynn et al. ............... 423/514
2,709,126   5/1955  Gollmar ................. 423/560 X Primary Examiner—Jack Cooper
Attorney, Agent, or Firm—William S. Brown; Donald A. Gardiner

[57] ABSTRACT

Hydrosulfides of sodium, potassium, calcium, barium and strontium are prepared by reaction of the oxide or hydroxide of the metal with sulfur in aqueous medium at elevated temperature and pressure.

5 Claims, No Drawings

PREPARATION OF HYDROSULFIDES

Hydrosulfides of alkali or alkaline earth metals are potentially useful in a variety of commercial applications including recovery of dissolved metals from metallurgical process or waste streams, or for waste water treatment to remove contaminating metals. Such recovery or removal processes are based on precipitation of the metals as sulfides, and require an inexpensive source of soluble sulfide. The hydrosulfides have been prepared by a variety of prior art processes, usually by reaction of the metal oxides, hydroxides, sulfides or other salts with hydrogen sulfide. However, these processes are generally too expensive to enable economical recovery of dissolved metals by precipitation as sulfides.

It has now been discovered, according to the process of the invention, that hydrosulfides of the alkali and alkaline earth metals, particularly sodium, potassium, calcium, barium and strontium, may be simply and economically prepared by reacting oxides or hydroxides of the metals with sulfur in aqueous media at elevated temperature and pressure. Suitable temperatures and pressures will range from about 200° to 250° C., preferably about 220° C., and about 210 to 560 psig, preferably about 320 psig. The predominant reactions involved in the process are believed to be as follows:

$$2M(OH)_2 + 3S \rightarrow M(HS)_2 + MSO_3 + H_2O$$

$$2M(OH)_2 + 4S \rightarrow M(HS)_2 + MS_2O_3 + H_2O$$

$$4NOH + 3S \rightarrow 2NHS + N_2SO_3 + H_2O$$

$$4NOH + 4S \rightarrow 2NHS + N_2S_2O_3 + H_2O,$$

where M is an alkaline earth metal and N is an alkali metal.

The reaction may be carried out in any conventional reaction vessel capable of providing the required temperature and pressure. An aqueous slurry of the metal oxide or hydroxide and sulfur, preferably in finely divided form, is introduced to the reaction vessel, and the temperature and pressure are maintained at the required levels for a time sufficient to maximize formation of hydrosulfides. Optimum time will depend on the specific reactants, temperature, pressure and concentrations, but a time of about 30 minutes is usually sufficient. Additional reaction time, e.g., up to about 1 hour has generally been found to provide little additional hydrosulfide product.

Optimum concentrations of reactants will depend on the specific reactants, as well as temperature, pressure and state of subdivision of the reactants. However, a range of concentrations of about 0.5 to 4 molar, preferably about 1 molar, with respect to the metal oxide or hydroxide and a range of about 0.75 to 6 molar, preferably about 1.5 molar, with respect to the sulfur generally gives good results. After completion of the reaction, any insoluble residue of reactants or reaction products is separated by conventional means such as filtration to provide a solution of hydrosulfide that can be used for precipitation of metal sulfides for the purposes discussed above.

The process of the invention will be more specifically illustrated by the following examples.

EXAMPLE 1

Twenty-eight grams (0.5 mole) of calcium oxide and 24 grams (0.75 mole) of sulfur were slurried in 500 ml of water and heated at 220° C. for 1 hour in a batch pressure reaction apparatus at 320 psig. Samples of the resultant solution and solid residue were analyzed for various sulfur compounds.

EXAMPLE 2

The procedure of example 1 was followed except the reaction temperature and pressure was 150° C. and 54 psig.

EXAMPLE 3

Same reactants as example 1 except the reaction temperature was 90° C. and the reaction was conducted in an open vessel.

The results of examples 1 to 3 are shown in table 1. It is obvious from these results that increasing the reaction temperature from 90° through 150° to 220° C. significantly increased the proportion of dissolved sulfur converted to the desired hydrosulfide ion.

Table 1

| | | | Effect of reaction temperature on sulfur dissolution and distribution of sulfur compounds | | | | |
|---|---|---|---|---|---|---|---|
| | Reaction | Sulfur | Distribution of soluble sulfur pct | | | | |
| Example | temp, °C. | dissolved, pct | $HS^-$ | $S_2O_3^=$ | $SO_4^=$ | $SO_3^=$ | $S_x^=$ |
| 1 | 220 | 69 | 87 | 1.2 | 0.5 | 0 | 11 |
| 2 | 150 | 79 | 60 | 5 | 0.4 | 0 | 34 |
| 3 | 90 | 99 | 18 | 20 | 1 | 0 | 61 |

EXAMPLE 4

Forty grams of sodium hydroxide (1 mole) and 28 grams of sulfur (0.75 mole) were slurried in 500 ml of water and stirred 1 hour in an open vessel at 90° C. The resultant solution was analyzed for sulfur compounds.

EXAMPLE 5

Same reactants as example 4 but the reaction was conducted for 1 hour at 220° C. and a pressure of 320 psig in a pressure reaction vessel.

EXAMPLE 6

Fifty-six grams of potassium hydroxide (1 mole) and 28 grams of sulfur (0.75 mole) were slurried in 500 ml of water and stirred 1 hour at 90° C. in an open vessel. The resultant solution was analyzed for sulfur compounds.

EXAMPLE 7

Same reactants as example 6 but the reaction was conducted for 1 hour at 220° C. and a pressure of 320 psig in a pressure reaction vessel.

EXAMPLE 8

One hundred and thirty-three grams of strontium hydroxide (0.5 mole) and 24 grams sulfur (0.75 mole) were slurried in 500 ml water and stirred 1 hour at 90°

C. in an open vessel. The resulting solution and solid residue were analyzed for sulfur compounds.

EXAMPLE 9

Same reactants as example 8 but the reaction was conducted for 1 hour at 220° C. and a pressure of 320 psig in a pressure reaction vessel.

EXAMPLE 10

Seventy-six and one-half grams of barium oxide (0.5 mole) and 24 grams sulfur (0.75 mole) were slurried in 500 ml water and stirred 1 hour at 90° C. in an open vessel. The resulting solution and solid residue were analyzed for sulfur compounds.

EXAMPLE 11

Same reactants as example 10 but the reaction was conducted for 1 hour at 220° C. and a pressure of 320 psig in a pressure reaction vessel.

The results of examples 4 through 11 are shown in table 2. Sulfur dissolution at 220° C. was similar for tests using alkaline earth oxides. Sodium and potassium hydroxides reacted completely with sulfur to form soluble sulfur compounds.

Table 2
Reaction of various alkali and alkaline earth oxides or hydroxides with sulfur

| Example | Alkaline reactant | Reaction temp, °C. | Sulfur dissolved, pct | Distribution of soluble sulfur, pct | | | | |
|---|---|---|---|---|---|---|---|---|
| | | | | $HS^-$ | $S_2O_3^=$ | $SO_4^=$ | $SO_3^=$ | $S_x^=$ |
| 4 | NaOH | 90 | >99 | 15.6 | 50.1 | 0.1 | 0.6 | 33.6 |
| 5 | NaOH | 220 | >99 | 40.8 | 44.0 | 1.1 | 1.3 | 12.8 |
| 6 | KOH | 90 | >99 | 18.1 | 27.2 | 0.7 | 0.5 | 53.5 |
| 7 | KOH | 220 | >99 | 48.1 | 39.3 | 0.8 | 1.5 | 10.3 |
| 8 | Sr(OH)$_2$ | 90 | 84.2 | 17.4 | 35.6 | 2.4 | Nil | 44.6 |
| 9 | Sr(OH)$_2$ | 220 | 67.0 | 94.8 | 5.0 | 0.2 | Nil | Nil |
| 10 | BaO | 90 | 86.4 | 0.7 | 3.1 | 0.2 | Nil | 96.0 |
| 11 | BaO | 220 | 65.9 | 93.2 | 2.7 | 0.1 | Nil | 4.0 |

We claim:
1. A process for preparation of an aqueous solution having a high content of hydrosulfide ion comprising reacting an oxide or hydroxide of calcium, barium or strontium with elemental sulfur in aqueous medium at a temperature of about 200° to 250° C. and a pressure of about 210 to 560 psig.
2. The process of claim 1 in which the metal is calcium.
3. The process of claim 1 in which the metal is barium.
4. The process of claim 1 in which the metal is strontium.
5. The process of claim 1 in which the reaction temperature is about 220° C. and the pressure is about 320 psig.